June 3, 1969

R. S. SPROULE 3,447,782

SUPPLY OF SEALING FLUID FOR ROTARY FLUID MACHINES

Filed Oct. 16, 1967

ROBERT STANLEY SPROULE
INVENTOR.

BY R.Q. Eckersley

Agent 3,447,782
SUPPLY OF SEALING FLUID FOR
ROTARY FLUID MACHINES
Robert Stanley Sproule, Montreal, Quebec, Canada, assignor to Dominion Engineering Works, Limited, Lachine, Quebec, Canada, a corporation of Canada
Filed Oct. 16, 1967, Ser. No. 680,288
Claims priority, application Great Britain, Oct. 27, 1966, 48,263/66
Int. Cl. F01d 11/06
U.S. Cl. 253—26                    3 Claims

ABSTRACT OF THE DISCLOSURE

Control of the location of a gas-liquid sealing interface bounding one end of the aeration space of a shrouded turbo machine is effected by varying the admission of the gas in response to changes in the static pressure head of the liquid providing the seal interface, so as to maintain the gas-liquid interface effectively located in sealing relation with a flinger member of the shroud.

---

This invention is directed to a hydraulic turbo machine, and in particular to improved aeration means therefor.

In the operation of shrouded turbo machines, such as Francis turbines, centrifugal pumps, or pump-turbines proposals have been made for the aeration of annular zones adjacent runner shrouds, in order to reduce the drag of fluid acting on the external shroud surface. Such prior aeration schemes have suffered from practical disadvantages in difficulty experienced in preventing the ingress of water into the aeration space, and in maintaining the aeration space or spaces clear of water, while avoiding the expenditure of copious quantities of air.

In operating machines of this type, sudden variations of pressure at the diffuser may occur, changing the pressure by as much as 100 feet of water, and in prior machines can produce flooding of the aeration chamber, resulting in subsequent difficulty in reestablishing areation.

An object of the present invention is to provide an economical arrangement for controlling the supply of air to the aeration space of a turbo machine.

A further object of the invention is to provide an aeration system having a rapid response characteristic to variations in operating conditions.

Thus there is provided in a rotary turbo machine such as a pump, turbine or pump turbine having a shrouded runner rotatably mounted within a stationary housing, at least one annular shroud of the runner forming with an adjacent portion of the housing an annular shroud space having a gas supply means connected thereto to supply an aeration gas to a portion of the shroud space, annular partition means dividing the shroud space into an annular aeration space extending between the shroud and the partition member and an annular chamber bounded by the partition means and the housing in restricted liquid flow communication with annular edge portions of the shroud bounding the aeration space, a portion of the partition and a facing portion of the shroud forming a substantially radially extending clearance therebetween for a gas/liquid interface sealing the radially inner end of the aeration space from the chamber, the improvement comprising liquid head responsive means connecting with the liquid in the chamber, gas admission means to control the supply of gas to the aeration space, and means connecting the head responsive means with the gas admission means in controlling relation therewith to vary the volume of gas admitted to the aeration space in response to the liquid head in the chamber to maintain the gas/liquid interface in stabilized relation within the radial clearance, whereby the loss of gas past the interface is substantially precluded.

In addition the invention provides a turbo machine for operation with a working liquid such as water, having a stationary housing, a runner rotatably mounted therein having an annular shroud portion attached to the blades of the runner and forming with an adjacent portion of the housing an annular shroud space surrounding a portion of the runner and located intermediate annular pressure edges of the shroud, means to supply pressurized fluid of relatively low density and viscosity such as air to a portion of the shroud space, an annular flinger member extending outwardly from the shroud relative to the runner main axis in substantial radial overlapping relation with a stationary portion of the housing to define therebetween an annular running clearance bounding the shroud space adjacent the exterior low pressure edge of the runner wherein a water ring having an air-water interface is established during operation of the machine, and means for maintaining substantially constant the effective head of water on the annular flinger member, by controlling the admission of pressurized air in response to variation in the effective head on the water ring, whereby the water ring is retained within the close running clearance, and leakage of the air therepast is substantially precluded during normal running.

Certain embodiments of the present invention are described by way of example, reference being had to the accompanying drawings wherein.

Figure 2:
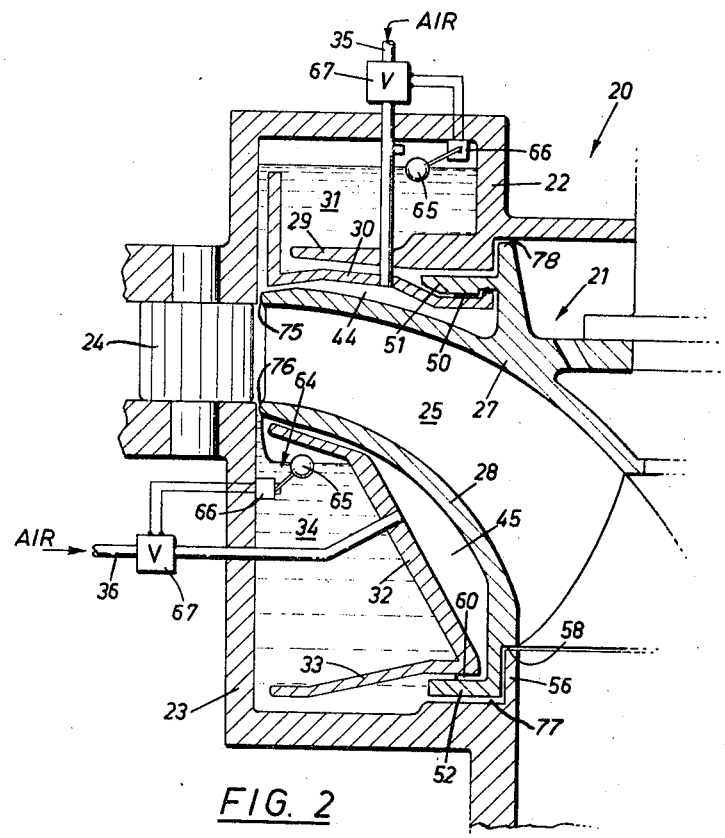
FIGURE 2 is a half section of a turbine incorporating alternative embodiments of the present invention.

Referring first to FIGURE 2, the turbine 20 comprises a runner 21 having an upper housing portion 22, a lower housing portion 23 and guide vanes 24 in facing relation with the runner blades 25.

The runner 21 has an upper shroud or crown 27 and a lower band shroud or skirt 28 with the blades 25 extending therebetween. The exterior surface portion of the crown shroud 27 is bounded by the high pressure edge 75 and the low pressure edge 78, while the exterior surface portion of the band shroud 28 is bounded by the high pressure edge 76 and the low pressure edge 77.

A crown upper baffle 29 and a crown lower baffle 30 divide the crown space into a crown float chamber 31 and a crown air chamber 44.

The skirt upper baffle 32 and skirt lower baffle 33 divide the lower shroud space into a skirt air chamber 45 and a skirt float chamber 34.

By making the float chamber 34 of sufficient size, a substantial swirl chamber for the separation of air and water is provided, thus reducing air loss due to air entrainment in the leakage water.

Air supply pipes 35, 36 provide pressurized air supply to the respective upper and lower air chambers 44, 45, being of sufficient capacity to admit air at a rate sufficient to avoid any substantial rise in water level in the float chambers 31, 34, when sudden increases in water pressure occur due to wicket gate or penstock changes. Any excess air can readily spill from the air chamber 45, by way of passage 60, when sudden reduction in pressure of the working liquid occurs.

Figure 1:
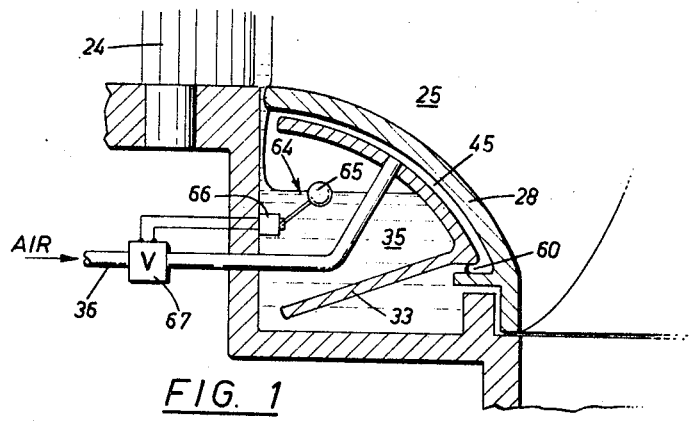
FIGURE 1 is a diametral part section of a turbine incorporating embodiments of the present invention.

The radially inner ends of the air chambers 44, 45 connect by way of restricted passages 50, 60 with the respective float chambers 31, 34. Restricted passages or clearances 59, 60 extend between flinger rings 51, 52 which provide considerable radial overlap with the partition structures 30, 33 respectively. Leakage of liquid past the shrouds 27, 28 is minimized by the provision of a close running clearance as shown in FIGURE 1 or by a seal of extended flow path on the obverse side of the flinger rings 51, 52 illustrated in FIGURE 2. This seal normally withstands substantially the full static head applied to the machine, possibly in the order of 500 feet of water.

Figure 3:
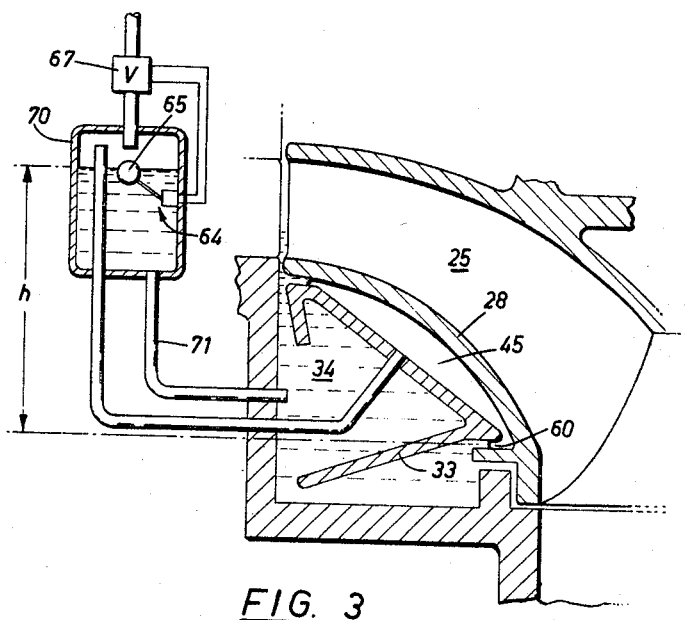
FIGURE 3 is a view similar to FIGURE 1 incorporating an alternative air supply control arrangement.

Referring to FIGURES 1 and 3, these illustrate different embodiments of the air supply control. FIGURES 1 and 2 illustrate the use of monitoring float switches 64 for monitoring water level and controlling the quantity of air supplied to the aeration chambers 44, 45, in response to the level of liquid in the chambers 31, 34 respectively. The float switches 64 comprise float members 65 supported on a pivotal arm from the housing 66 containing a simple switch arrangement, such as a micro switch, the output of which controls air valve 67. Thus in operation an increase in the respective liquid level in chamber 31 or chamber 34 actuates the switch (not shown) in respective housing 66 to release additional pressurized air past the electro valve 67 into the respective air chamber 44 or 45, to restore the liquid level to the desired condition. The quantitative value of the static head $h$ given by the mean float position above the respective flinger ring 51, 52 is selected to provide sufficient head of water at the flinger ring to substantially preclude leakage of air from the respective air chamber 44 or 45 by impressing head $h$ on the ring at clearances 59, 60 in the flinger and so maintaining the air-water interface at a predetermined position.

Experience has shown that a 40 inch head $h$ was successfully used in one embodiment.

The embodiment illustrated in FIGURE 3 shows the use of an external float chamber where space considerations prevent the necessary value of head $h$ being provided by a float chamber within the machine. The water pipe 71 connecting with the external float chamber 70 must be of sufficient size to substantially prevent any pressure drop along the pipe.

The invention thus provides a simple control means to maintain a sealing air-water interface at a selected location within the shroud space of the machine, to provide aeration with minimum provision of air or an alternative liquid displacing fluid.

It will be understood that the float arrangement can be utilized directly to control an air admission control valve.

The passage of air into the shroud space is controlled to provide minimal air leakage at normal working conditions, while the wetted shroud periphery is minimized.

In the embodiment illustrated in FIGURE 2, an upstanding axial flange 56 in the draft tube extends within a recess 58 in the skirt flange to permit an effective increase in water chamber depth within the shroud chamber with minimum effective increase of liquid drag. Flange 56 and recess 58 together form an effective resistance to flow between them, so that the increased drag caused by flange 56 is compensated by a reduction in water leakage.

It is contemplated that the present invention may be used in conjunction with a by-pass air supply to the shroud air space providing a continuous supply of make-up air. Alternatively the air control arrangement of the present invention may provide an incremental air supply, or incorporate a built in by-pass to maintain a continuous make-up supply to the aeration chamber.

What I claim as new and desire to secure by Letters Patent of the United States is:

1. A turbo machine having a stationary housing, a runner rotatably mounted therein having an annular shroud portion attached to the blades of the runner and forming with an adjacent portion of the housing an annular shroud space surrounding a portion of the runner and located intermediate the high pressure edge and the low pressure edge of the shroud, stationary circumferential partition means to divide said shroud space, means to supply a pressurized gaseous fluid of relatively low density and low drag such as air to a portion of said shroud space, an annular flinger member extending outwardly from the shroud relative to the runner main axis in substantial radial overlapping relation with a portion of said stationary partition means located on the side of said flinger member remote from said low pressure shroud edge to define an annular running clearance bounding the shroud space adjacent the low pressure edge of the runner wherein a liquid ring having a gas-liquid interface is established during operation of the machine, gas flow control means connected to said gaseous supply; liquid level responsive means connected with said shroud space on the side of said circumferential partition remote from said shroud portion, having a float mounted in substantially unrestricted flow connection with said liquid ring; and means connecting said liquid level responsive means in controlling relation with said gas flow control means to maintain the effective static head at said flinger member outer periphery substantially constant whereby said gas-liquid interface is stabilized.

2. A machine as claimed in claim 1 wherein said float is connected with electrical switching means to provide energization of a gas admission control valve of said gas flow control means.

3. A machine as claimed in claim 2, wherein said float actuated valve is positioned within a float chamber located externally of said shroud space, the free water surface in the chamber being positioned vertically above the level of the shroud, whereby the static pressure head provided may be in excess of the vertical dimension of said shroud aeration space.

References Cited

UNITED STATES PATENTS

| 3,236,499 | 2/1966 | Chatfield et al. | 253—26 |
| 3,239,193 | 3/1966 | Kerensky | 253—26 |
| 3,245,656 | 4/1966 | Desbaillets et al. | 253—26 |
| 3,253,816 | 5/1966 | Sproule | 253—26 |

EVERETT A. POWELL, JR., *Primary Examiner.*